US007609494B2

(12) United States Patent
Webb

(10) Patent No.: US 7,609,494 B2
(45) Date of Patent: Oct. 27, 2009

(54) VOLTAGE PROTECTION SYSTEM AND METHOD FOR A POWERED DEVICE

(75) Inventor: Richard Bruce Webb, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 322 days.

(21) Appl. No.: 11/480,328

(22) Filed: Jun. 30, 2006

(65) Prior Publication Data
US 2008/0002318 A1    Jan. 3, 2008

(51) Int. Cl.
H02H 3/20    (2006.01)
(52) U.S. Cl. ........................................ 361/56; 361/91.7
(58) Field of Classification Search .................... 361/35, 361/56, 111, 91.7
See application file for complete search history.

(56) References Cited

U.S. PATENT DOCUMENTS 5,615,094 A    3/1997    Cosentino et al. ............. 363/56
5,982,639 A *  11/1999   Balakirshnan ............ 363/21.18
6,212,081 B1 *  4/2001   Sakai ........................... 363/71
6,381,156 B1 *  4/2002   Sakai et al. .................. 363/65
6,584,965 B1 *  7/2003   Ward ........................... 123/605
6,630,805 B2   10/2003   Makaran ..................... 318/254
2005/0169020 A1 *  8/2005   Knill ....................... 363/56.01

OTHER PUBLICATIONS

International Search Report from counterpart forign application No. PCT/US2007/15416.

* cited by examiner

Primary Examiner—Danny Nguyen
(74) Attorney, Agent, or Firm—Schwegman, Lundberg & Woessner, P.A.

(57) ABSTRACT

A powered device includes a voltage protection circuit, two outputs, a switch, and a snubber circuit. The two outputs of the integrated circuit may be coupled to an external transformer. The snubber circuit of the integrated circuit is responsive to the switch and is coupled with respect to the two outputs to direct energy from at least one of the two outputs to the voltage protection circuit.

26 Claims, 4 Drawing Sheets

VOLTAGE PROTECTION SYSTEM AND METHOD FOR A POWERED DEVICE

FIELD OF THE DISCLOSURE

The present disclosure relates generally to systems and methods of protecting integrated circuit components against power events, such as inductive voltage and electrostatic discharge (ESD) events.

BACKGROUND

In an integrated circuit having a flyback switching regulator topology, an external transformer is coupled to the integrated circuit to provide a direct current to direct current (DC-to-DC) isolated power supply to attached circuitry. Typically, a primary winding of the transformer may be coupled to a transistor that is controlled by an output pin of the integrated circuit to activate the external transformer. The transformer may produce an inductive voltage, sometimes referred to as an inductive voltage kick, when the transistor is shut off, for example. The inductive voltage kick is generated due to the change in current of the inductive winding of the transformer, since the inductive winding tends to oppose current change. The inductive winding of the transformer continues to drive current, even when the voltage supply to the inductive winding is removed. The inductive voltage kick may cause the voltage level to exceed a voltage rating of the transistor.

Generally, an integrated circuit device may include components to prevent such an inductive voltage kick from exceeding a safe voltage level for the transistor. For example, a snubber circuit may be utilized to provide a level of voltage protection for the transistor. A typical snubber circuit is implemented using external, discrete circuit components. However, if the snubber circuit is external to the integrated circuit device, the connection pins that couple the snubber circuit to the integrated circuit device may expose the integrated circuit device to electrostatic discharge (ESD) events during manufacture, assembly, and handling. Adding ESD protection components may add additional costs and complexity.

Therefore, there is a need for an integrated circuit device that has enhanced protection against power events, such as ESD and inductive voltage events.

SUMMARY

In a particular illustrative embodiment, a powered device is provided that includes a voltage protection circuit, two pins, a switch, and a snubber circuit. The two pins include a first pin and a second pin that are responsive to an external transformer. The snubber circuit is part of an integrated circuit and is responsive to the switch. The snubber circuit is coupled with respect to the two pins to direct energy from at least one of the two pins to the voltage protection circuit. In one embodiment, the energy results from an inductive voltage kick from the external transformer. In another embodiment, the energy results from an electrostatic discharge (ESD) event.

In another particular illustrative embodiment, the powered device includes first and second input pins responsive to an external power source and first and second output pins responsive to an external transformer. The first output pin may be coupled to the first input pin. The powered device also includes a third output pin coupled to the second input pin, and a voltage protection circuit to limit an input voltage. When a voltage on the second output pin exceeds a threshold, energy applied to the second output pin is directed to the voltage protection circuit. When a voltage on the second output pin is at or below the threshold, energy applied to the second output pin may be directed to the third output pin.

In yet another particular illustrative embodiment, a method is provided that includes detecting a power event at a snubber circuit of an integrated circuit. The snubber circuit may be coupled to a voltage protection circuit and may be responsive to an external transformer that is selectively connected to a negative supply terminal of the integrated circuit via a switch. The method also includes directing energy resulting from the power event to the voltage protection circuit via the snubber circuit when a voltage level associated with the power event exceeds a threshold.

In still another particular embodiment, an integrated circuit includes a transistor, an interface, and a snubber circuit. The transistor includes a first terminal, a second terminal coupled to a first power supply terminal, and a control terminal. The interface is coupled to the first terminal and is responsive to an external transformer to selectively activate the external transformer. The snubber circuit is responsive to the interface to direct an inductive voltage that exceeds a threshold to a voltage protection circuit to protect the transistor.

DETAILED DESCRIPTION OF THE DRAWINGS

Figure 1:
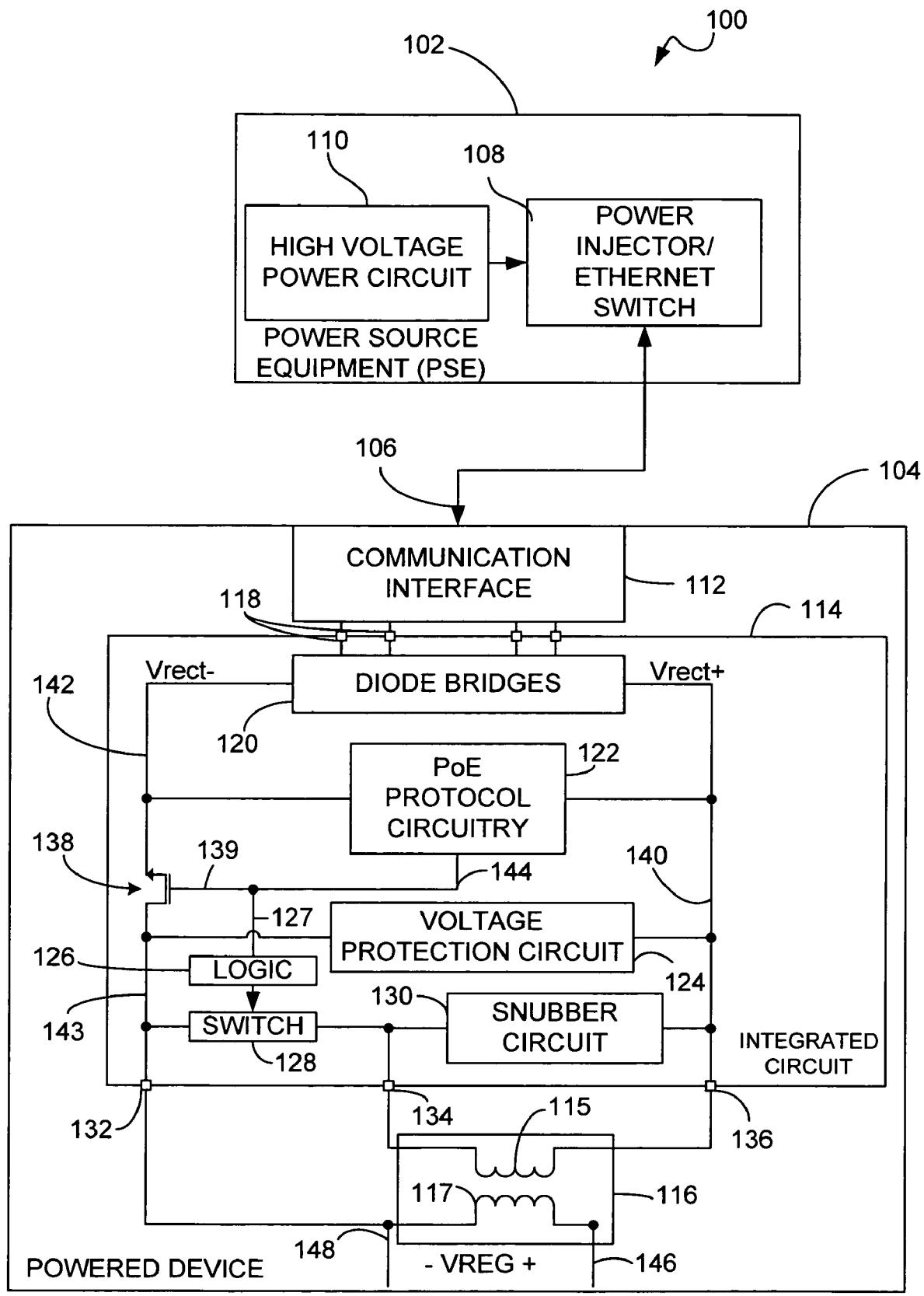
FIG. 1 is a general diagram of a particular illustrative embodiment of a Power over Ethernet (PoE) system.

FIG. 1 is a general diagram of a particular illustrative embodiment of a power over Ethernet system 100. The system 100 includes power sourcing equipment (PSE) 102 coupled to a powered device 104 via an Ethernet connection 106. The Ethernet connection 106 may be a twisted pair cable, such as a CAT5 twisted pair cable, a coaxial cable, and the like. The PSE 102 includes a high-voltage power circuit 110 and a power injector/Ethernet switch 108. The power injector/Ethernet switch 108 receives a power supply from the high-voltage power circuit 110 and injects the power supply to selected Ethernet ports to provide power to the powered device 104 via the Ethernet cable 106. Generally, the PSE 102 provides both power and data over the same cable 106.

The powered device 104 includes a communication interface 112, an integrated circuit 114, and a DC-to-DC converter 116. The integrated circuit 114 includes pins 118, diode bridges 120, Power over Ethernet (PoE) protocol circuitry 122, a voltage protection circuit 124, logic 126, a switch 128, and a snubber circuit 130. The integrated circuit 114 also includes output pins 132, 134, and 136. The integrated circuit 114 may also include a transistor 138 and voltage supply terminals 140, 142, and 143. The DC-to-DC converter 116 may include a primary winding 115, and a secondary winding 117. The primary winding 115 is coupled to the output pin 136 and to the output pin 134. Current flow through the primary winding 115 creases a magnetic flux in a core of the transformer 116, which induces a voltage in the secondary winding 117 based on a mutual inductance between the windings 115 and 117. The secondary winding 117 includes a first terminal 146 and a second terminal 148 to provide a regulated voltage (Vreg) to power an associated load. The second terminal 148 is coupled to the output pin 132.

The communication interface 112 is coupled to the Ethernet cable 106 to receive power and data from the PSE 102. The diode bridges 120 are coupled to the communication interface 112 via input pins 118. The diode bridges 120 are connected to voltage supply terminals 140 and 142 to deliver a rectified power supply to associated circuit elements. The diode bridges 120 may be responsive to the communication interface 112 to receive a power supply input from the PSE 102 and to provide a rectified power supply to the voltage supply terminals 140 and 142.

The power over Ethernet (PoE) protocol circuitry 122 is coupled between the voltage supply terminals 140 and 142 and provides PoE protocol functions, including controlling the powered device 104 to respond to the PSE 102 during a PoE detection process, for example. The voltage protection circuit 124, such as a surge protector, is coupled between the power supply terminals 140 and 142 to detect a power surge event and to shunt a voltage between the power supply terminals 140 and 142 when the voltage exceeds a threshold. The snubber circuit 130 is coupled to the power supply terminal 140 and to output pin 134. The switch 128 is coupled to output pin 134 and to the power supply terminal 143.

The transistor 138 may include a control terminal 139 coupled to the power over Ethernet protocol circuitry 122 via line 144, a first terminal coupled to the voltage supply terminal 142, and a second terminal coupled to the voltage supply terminal 143. The switch 128 may be connected between the snubber circuit 130 and the voltage supply terminal 143. The switch 128 is also coupled to logic 126 to receive a control signal. The logic 126 may be coupled to the PoE protocol circuitry 122, such as by line 127, to receive a control signal related to a connection status of the powered device 100. For example, the logic 126 may selectively activate the switch 128 when at least two inputs pins 118 of the integrated circuit 114 are coupled to an external power source, such as the PSE 102. In one particular embodiment, such as that shown in FIG. 2 below, the logic 126 may be included in the snubber circuit 130.

In general, the powered device 104 utilizes a flyback switching regulator topology, where the switch 128 may be used to activate the primary winding 115 of the DC-to-DC converter 116 to induce a voltage in the secondary winding 117. The switch 128 may include a transistor having a first terminal coupled to the primary winding 115 of the DC-to-DC converter 116 via the pin 134, a control terminal responsive to the logic 126, and a second terminal coupled to the voltage supply terminal 143. The switch 128 may to selectively couple the pin 134 to the voltage supply terminal 143 to activate, for example, the primary winding 115 of the DC-to-DC converter 116.

In operation, during an overshoot condition, when the switch 128 is turned off, an inductive voltage kick may develop at the output pin 134 due to a leakage inductance from the primary winding 115 of the DC-to-DC converter 116. The snubber circuit 130 may direct energy resulting from a power event, such as the inductive voltage kick or an electrostatic discharge at the output pin 134, to the voltage protection circuit 124 via the voltage supply terminal 140. The voltage protection circuit 124 may be an over-voltage protection circuit to shunt excess voltage between the voltage supply terminals 140 and 143 when the voltage differential between the voltage supply terminals 140 and 143 exceeds a threshold voltage.

In general, the snubber circuit 130 impedes current flow when a voltage level across the snubber circuit 130 is less than a threshold and directs energy to the voltage protection circuit 124 when the voltage level across the snubber circuit 130 exceeds the threshold. The snubber circuit 130 directs energy resulting from inductive voltage kicks and ESD events from the external pins 134 and 136 to the voltage protection circuit 124, after an inductive voltage kick of the external DC-to-DC converter 116 (such as a transformer) or after an electrostatic discharge (ESD) event. By directing energy resulting from both inductive voltage kicks and ESD events, the snubber circuit 130 enables utilization of a single voltage protection circuit 124 to protect the integrated circuit 114 from multiple types of power events, thereby lowering the overall cost of providing power surge protection.

In general, the snubber circuit 130 may be designed to selectively block current flow during normal operation (during a first mode of operation) and to direct current flow when the voltage across the snubber circuit 130 exceeds a threshold (during a second mode of operation). In one particular embodiment, the snubber circuit 130 is designed to divert or direct energy away from the switch 128 such that a sum of an input voltage supply (across voltage supply terminals 140 and 142 during normal operation) and the voltage across the snubber circuit 130 (between the voltage supply terminal 140 and the output pin 134) is less than a safe operating voltage rating of the switch 128.

In one particular illustrative embodiment, the snubber circuit 130 prevents a voltage across the switch 128 (for example, measured between the output pins 134 and 132) from exceeding a voltage rating of the switch 128. Generally, the voltage rating of the switch 128 may be defined by a manufacturer of the switch 128 based on a voltage level at which the switch 128 may fail.

In still another particular embodiment, energy at the output pin 134 is received after an inductive kick of the DC-to-DC converter 116 (from the primary winding 115 of the transformer). In another particular embodiment, energy at the output pin 134 is received after an electrostatic discharge (ESD) event.

Figure 2:
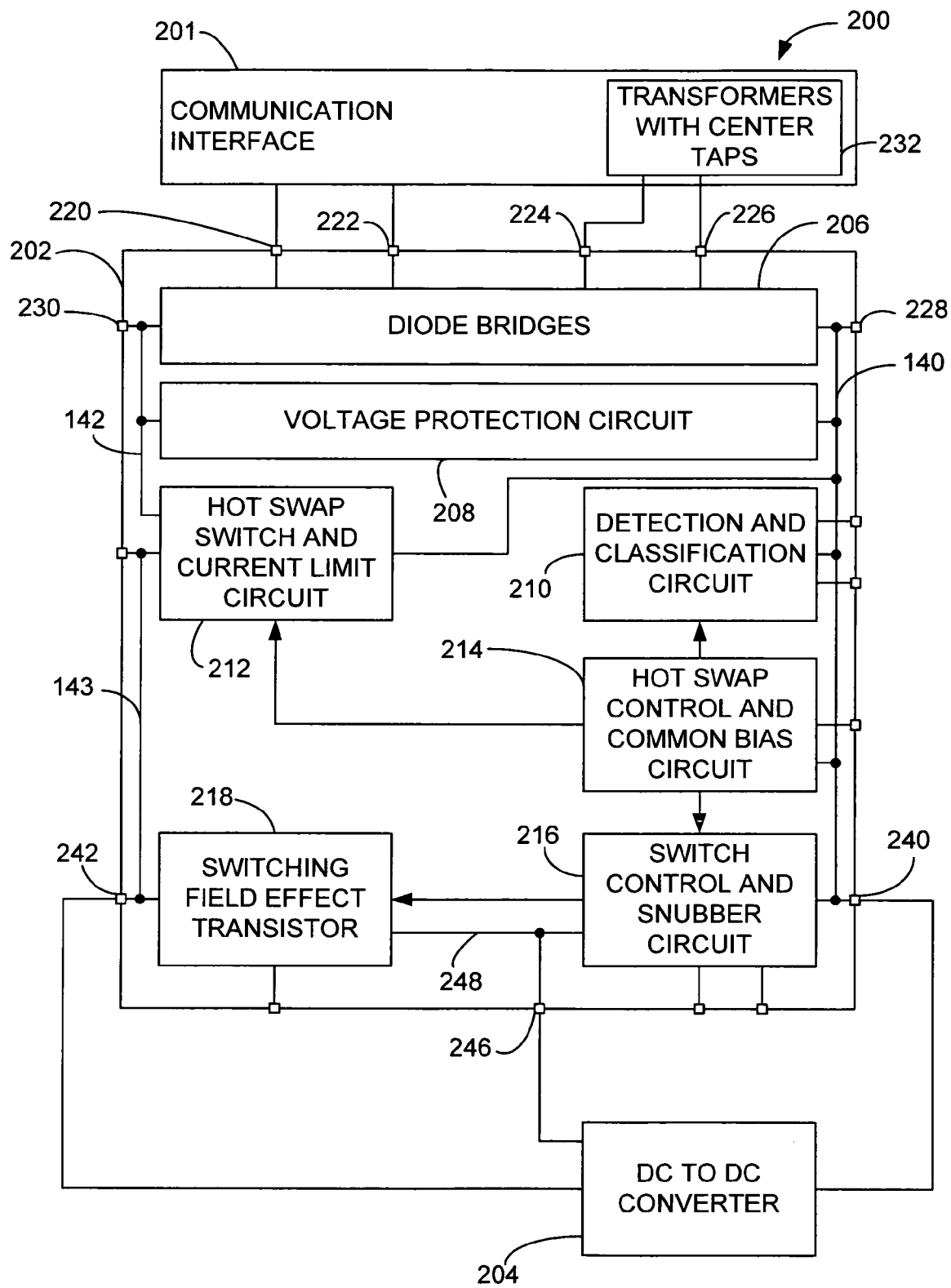
FIG. 2 is a block diagram illustrating a particular embodiment of an integrated circuit coupled to an external direct current to direct current (DC-to-DC) converter, which may be utilized in a powered device, such as that shown in FIG. 1.

FIG. 2 illustrates a particular embodiment of a powered device 200, such as that shown in FIG. 1. The powered device 200 includes a communication interface 201, an integrated circuit 202 and a DC-to-DC converter 204. The integrated circuit 202 includes diode bridges 206, over-voltage protection 208, a detection and classification circuit 210, a hot swap switch and current limit circuit 212, a hot swap control and common bias circuit 214, switch control and snubber circuit 216, and a switching field effect transistor 218. Additionally, the integrated circuit 202 includes multiple pins. Input pins 220, 222, 224, and 226 are adapted to connect to a communication interface, such as communication interface 112 in FIG. 1. The integrated circuit 202 also includes internal power supply terminals 140, 142 and 143.

In a Power over Ethernet (PoE) environment, input pins 220 and 222 may be coupled to spare wire pairs of an Ethernet cable via the communication interface 201 to receive power from power sourcing equipment (PSE) coupled to the other end of the cable. Input pins 224 and 226 may be coupled to center taps of transformer windings 232 of the communication interface 201 to connect to twisted wire pairs of an Ethernet cable, such as the cable 106 in FIG. 1, that carry both power and data. Output pins 228 and 230 are coupled to the diode bridges 206 to provide a positive rectified voltage supply and a negative rectified voltage supply, respectively. The detection and classification circuit 210 may draw an appropriate detection current for the powered device 200 during a detection phase of operation and an appropriate current for classification of the powered device 200 during a classification phase. The hot swap control and common bias circuit 214 may provide a power loss indicator to associated circuitry, when a connection to the PSE is lost.

The hot swap switch and current limit circuit 212 may provide a hot swap output indicator, such as when the powered device 200 is connected to or disconnected from an Ethernet cable via the communication interface 201, for example. The pin 240 may be coupled to the switch control and snubber circuit 216 and to the external DC-to-DC converter 204. The pin 242 may be coupled to the switching field effect transistor (FET) 218 to provide a voltage supply output to a secondary winding of the DC-to-DC converter 204. The pin 246 is coupled to the switch control and snubber circuit 216, to a primary winding of the DC-to-DC converter 204, and to the switching FET 218 via line 248.

In operation, when the switching FET 218 is deactivated, an inductive voltage kick may be applied to the pin 246 by the DC-to-DC converter 204 due to inductive current leakage of the primary winding of the DC-to-DC converter 204. The switch control and snubber circuit 216 directs energy resulting from the inductive voltage kick from pin 246 to the over voltage protection circuit 208 via the voltage supply terminal 140. Additionally, during non-operating conditions, such as during transport or during manufacture, if an electrostatic discharge (ESD) event is received at the pin 246, the switch control and snubber circuit 216 directs ESD energy resulting from the ESD event away from the switching field effect transistor 218 to the over-voltage protection circuit 208 via the voltage supply terminal 140.

In general, the switch control and snubber circuit 216 serves a dual purpose as both an inductive voltage kick (inductive voltage flyback) protector and an ESD protector. By directing energy resulting from an inductive voltage or an ESD event away from the switching field effect transistor 218, the switch control and snubber circuit 216 allows a single bulk over voltage protection circuit, such as the over voltage protection circuit 208, to be utilized to protect against over voltage events, against ESD events, and against inductive voltage events. By using a single protection circuit 208, costs associated with the integrated circuit 202 of the powered device 200 may be reduced, while still providing voltage protection.

Figure 3:
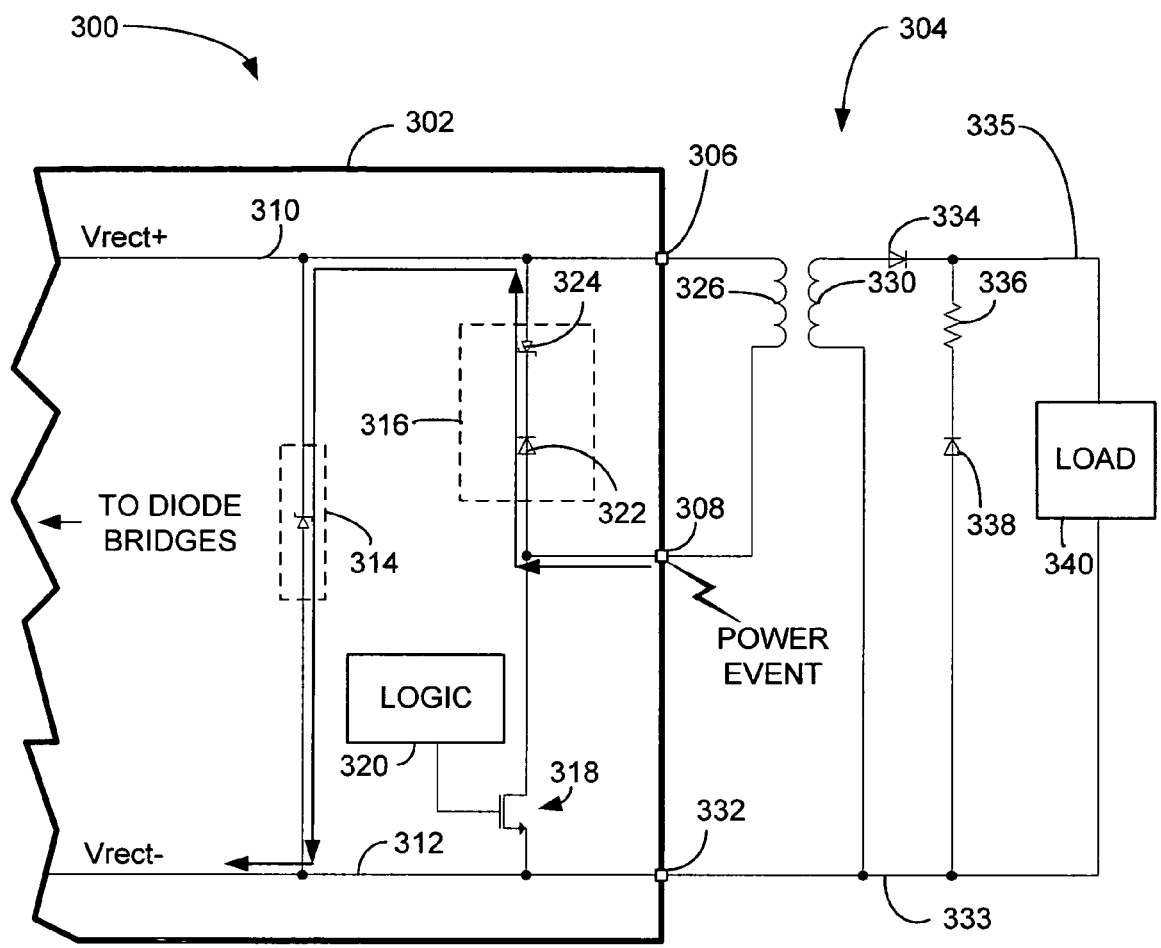
FIG. 3 is schematic circuit diagram of an illustrative portion of a particular embodiment of a system that includes protection for inductive voltage kicks and for ESD events.

FIG. 3 is schematic circuit diagram of an illustrative portion of a particular embodiment of a system 300 that includes protection for inductive voltage kicks and for ESD events. The system 300 includes an integrated circuit portion 302, which includes a voltage supply terminal 310, a voltage supply terminal 312, a voltage protection circuit 314, a snubber circuit 316, a transistor 318, and logic 320. The snubber circuit 316 includes a diode 322 and a breakdown diode 324. The integrated circuit portion 302 also includes pins 306, 308, and 332, which may be coupled to external circuitry 304, such as circuitry that may be used to implement the DC-to-DC converter 204 of FIG. 2. The voltage supply terminal 310 is connected to the pin 306. The voltage supply terminal 312 is connected to the pin 332. The voltage protection circuit 314 is coupled between the voltage supply terminals 310 and 312. The snubber circuit 316 is coupled between the voltage supply terminal 310 and the pin 308. The transistor 318 includes a first terminal coupled to the pin 308, a control terminal coupled to the logic 320, and a second terminal coupled to the voltage supply terminal 312.

The external circuitry 304 includes a primary winding 326 coupled to pin 306 and to pin 308. The external circuitry 304 also includes a secondary winding 330 coupled to the voltage supply pin 332. The secondary winding 330 is also coupled to an anode terminal of a diode 334. The cathode terminal of the diode 334 provides a voltage supply output on a positive supply terminal 335. The output pin 332 provides a voltage supply output on a negative supply terminal 333. A resistor 336 includes a first terminal coupled to positive supply terminal 335 and a second terminal coupled to a cathode of a diode 338, which includes an anode coupled to the negative supply terminal 333. A load 340 may be connected across the positive and negative supply terminals 335 and 333 to receive a DC voltage supply.

The voltage protection circuit 314 may include a zener breakdown diode or a diode stack including multiple diodes arranged in series, such that the cathode terminal is coupled to the voltage supply terminal 310 and the anode terminal is coupled to the voltage supply terminal 312. The snubber circuit 316, in a particular embodiment, may include a diode 322 and a breakdown diode 324. The diode 322 may include an anode terminal coupled to pin 308 and a cathode terminal. The breakdown diode 324 may include an anode terminal coupled to the voltage supply terminal 310 and a cathode terminal coupled to the cathode terminal of the diode 322. The breakdown diode 324 may include a zener diode, multiple zener diodes arranged in series, or another device adapted to switch on when a voltage across the device exceeds a threshold. The arrangement of the diode 322 and the breakdown diode 324 may be referred to as an anti-series arrangement. During normal operation, the diode 322 prevents or impedes current flow through the snubber circuit 316 from the voltage supply terminal 310 to the pin 308. In response to an ESD event or an inductive voltage kick from the external transformer 304, the breakdown diode 324 breaks down, allowing current to flow from the pin 308 to the voltage supply terminal 310.

During operation, the switch 318 couples the primary winding 326 of the external DC-to-DC converter 304 between the voltage supply terminals 310 and 312. When the logic 320 deactivates the transistor 318, the primary winding 326 may produce an inductive voltage kick received at the pin 308 due to leakage current within the primary winding 326, increasing a voltage level at pin 308. It should be understood that many low power devices operate using a negative power supply voltage, where the voltage supply terminal 310 may be at a voltage level that is approximately zero and where the voltage supply terminal 312 may be at a voltage level that is negative, for example.

When a voltage differential between the voltage supply terminal 310 and the pin 308 exceeds a threshold defined by the breakdown voltage of the diode 324, the snubber circuit 316 conducts current from the pin 308 to the voltage supply terminal 310. As the voltage level of the voltage supply terminal 310 increases, and when the differential voltage between the voltage supply terminals 310 and 312 exceeds a threshold voltage defined by the voltage protection circuit 314, the voltage protection circuit 314 breaks down to shunt the voltage between the positive and voltage supply terminals 310 and 312. Thus, the snubber circuit 316 may direct excess power or energy from the pin 308 to the voltage protection circuit 314. The snubber circuit 316 also operates to direct energy resulting from electrostatic discharge events from the pin 308 to the voltage protection circuit 314 during manufacture. Thus, the snubber circuit 316 directs energy away from the transistor 318 to the voltage protection circuit 314 when the voltage at pin 308 exceeds a threshold voltage level, to prevent the voltage at pin 308 from damaging the transistor 318 by exceeding its voltage rating.

In one particular embodiment, the zener diode 324 is a diode circuit including three diodes arranged in series, where each diode in the series has a breakdown characteristic of approximately 6.2 volts, which establishes a threshold breakdown voltage of approximately 18.6 volts. During normal operation, the diode 322 prevents current flow through the snubber circuit 316. During an overshoot condition, such as during an ESD event or when a flyback inductance voltage is received at pin 308, the snubber circuit 316 conducts current through diode 322 and the zener diode circuit 324 breaks down to conduct current to the voltage supply terminal 310. The snubber circuit 316 prevents the total voltage across the transistor 318 from exceeding a sum of the input voltage (between the voltage supply terminals 310 and 312) and a snubber voltage (across the snubber circuit 316, taken between the voltage supply terminal 310 and the pin 308).

In one particular illustrative embodiment, the integrated circuit 302 may include a transistor 318 that is operable as a switch. The transistor 318 includes a first terminal coupled to the pin 308, a second terminal coupled to a voltage supply terminal 312, and a control terminal coupled to the logic 320. The pin 308 is responsive to the external transformer 304 to selectively activate the external transformer 304. The snubber circuit 316 is responsive to the pin 308 to direct an inductive voltage that exceeds a threshold to a voltage protection circuit 314 to protect the transistor 318. In one particular embodiment, the snubber circuit 316 may be responsive to the pin 308 to direct an electrostatic discharge (ESD) event from the pin 308 to the voltage protection circuit 314 when the integrated circuit 302 is inactive.

In general, it should be understood that any of the pins 306, 308 and 332 may be exposed to an ESD event. If the ESD event is applied to either of the pins 306 or 332, the ESD event may be controlled by the voltage protection circuit 314, which shunts the surge between the voltage supply terminals 310 and 312. However, if the ESD event is applied to the pin 308, as shown, the snubber circuit 316 directs the energy away from the transistor 318 to the voltage protection circuit 314 via the voltage supply terminal 310. If the power event is an inductive voltage kick from the primary winding 326 of the transformer 304, the snubber circuit 316 directs the energy away from the transistor 318 via the same path. Thus, the snubber circuit 316 provides a dual use, which allows a single voltage protection circuit 314 to provide protection for both ESD and inductive voltage kick events.

When a voltage differential between the pin 306 and the pin 332 is approximately zero, the integrated circuit 302 may be below a lower threshold (such as a power on threshold). During this mode of operation, energy applied to the pin 308 may be directed away from the transistor 318 and to the voltage protection circuit 314, if the energy exceeds a threshold of the snubber circuit 316. During normal operations, such as when a voltage differential between the pins 306 and 332 is at a voltage level that is between the lower threshold and an input threshold (where the input threshold is defined by the voltage protection circuit 314), energy applied to the pin 308 may be directed to the pin 332 via the transistor 318.

In general, the integrated circuit 302 may be designed to include a voltage protection circuit that defines a first breakdown voltage and a snubber circuit 316 that defines a second breakdown voltage such that a sum of the first and second breakdown voltages is less than a voltage rating of the transistor 318. The manufacturer of the transistor 318 may define its voltage rating.

Figure 4:
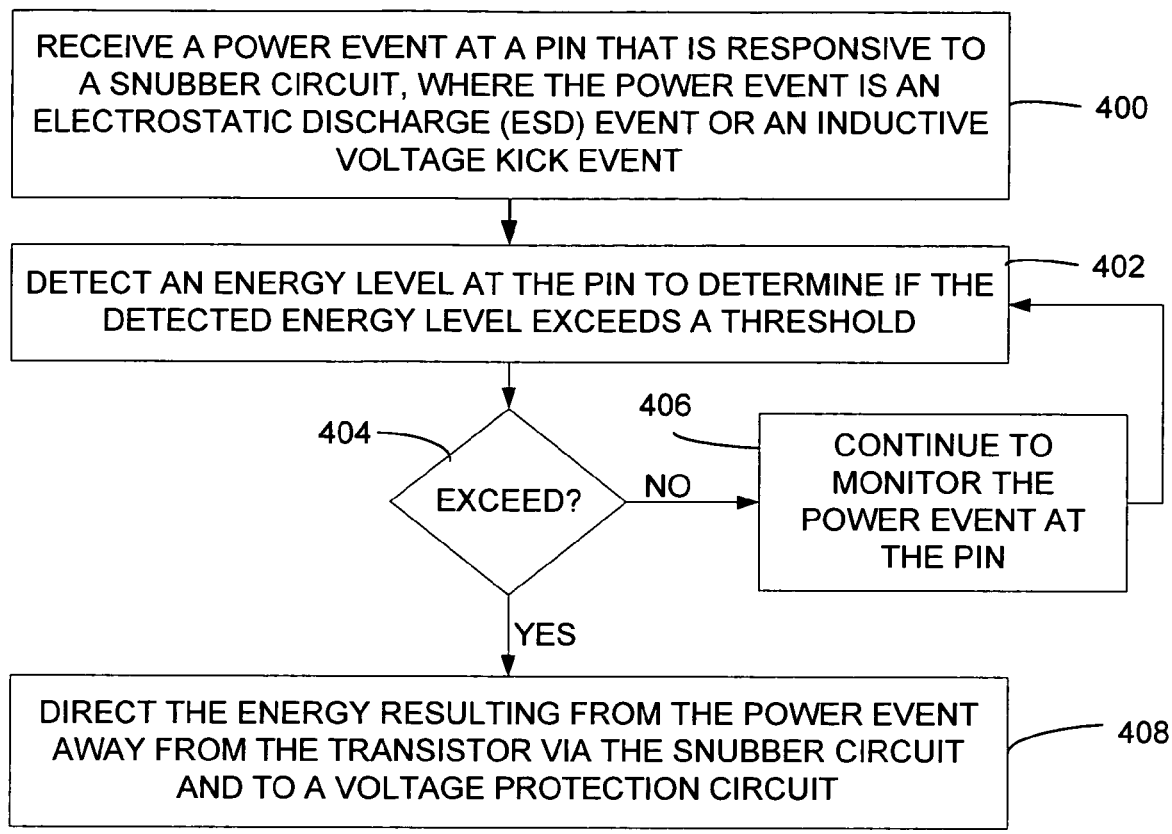
FIG. 4 is a flow diagram of a particular illustrative embodiment of a method of protecting a switching transistor against over voltage conditions.

FIG. 4 is a flow diagram of a particular illustrative embodiment of a method of protecting a switching transistor against destructive overvoltage. A power event is received at a pin that is responsive to a snubber circuit, where the power event is either an electrostatic discharge (ESD) event or an inductive voltage kick event (block 400). An energy level at the pin is detected to determine if the detected energy level exceeds a threshold (block 402). If the energy level does not exceed the threshold at block 404, then the power event is monitored at the pin (block 406) and block 402 is repeated. If the energy level exceeds the threshold at block 404, the energy resulting from the power event is directed away from the transistor via the snubber circuit and to a voltage protection circuit (block 408). In a particular embodiment, the threshold is associated with a safe power level of the transistor, such as a safe voltage rating for the transistor.

In one particular illustrative embodiment, the power event may include an electrostatic discharge (ESD) event. In another particular illustrative embodiment, the power event may include an inductive voltage kick. In one embodiment, a voltage may be detected that is in excess of a breakdown voltage level of a breakdown diode circuit of the snubber circuit. Current may be conducted via the snubber circuit away from the switch and to the voltage protection circuit in response to detection of the power event. In yet another embodiment, the safe power level of the switch includes a voltage rating determined by a manufacturer of the switch.

In general, it should be understood that a power event may include an electrostatic discharge event, an inductive voltage kick from an external transformer, other similar events, or any combination thereof. Additionally, it should be understood that the snubber circuit, such as the snubber circuit 316 in FIG. 3, may be designed to include a zener breakdown diode with a breakdown voltage level, such that the sum of the input voltage and the voltage across the snubber does not exceed a voltage rating of the transistor.

In one particular embodiment, a powered device detects a power event by detecting a voltage in excess of a breakdown voltage level of the breakdown diode circuit and conducting current across the snubber circuit from the switch to the voltage protection circuit in response to detection of the power event.

It should be understood that the external power source may be power sourcing equipment of a power over Ethernet (PoE) system. Alternatively, the external power source may be a battery or other external power supply. By integrating the snubber circuit with the integrated circuitry, the snubber circuit may be utilized to provide protection to the switching transistor, to protect the switching transistor from ESD events and from flyback inductive voltage kick from, for example, an external transformer. Thus, the snubber circuit provides dual protection for the transistor without requiring additional dedicated ESD protection circuitry.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A powered device comprising:
   a voltage protection circuit of an integrated circuit;
   two pins of the integrated circuit coupleable to an external transformer;

a switch of the integrated circuit, the switch comprising a transistor having a first terminal coupled to a terminal of an external transformer, a control terminal responsive to Power over Ethernet (PoE) protocol logic, and a second terminal coupled to the negative supply terminal, the switch to selectively couple the first and second terminals to activate the external transformer; and a snubber circuit of the integrated circuit responsive to the switch, the snubber circuit responsive to the two pins to direct energy resulting from a power event away from the switch to the voltage protection circuit.

2. The powered device of claim 1, wherein the snubber circuit comprises:
a diode including an anode terminal coupled to the switch and including a cathode terminal; and
a diode breakdown circuit including a cathode terminal coupled to the cathode terminal of the diode and including an anode terminal coupled to the voltage protection circuit.

3. The powered device of claim 1, wherein the snubber circuit is to prevent a voltage across the switch from exceeding a threshold voltage.

4. The powered device of claim 1, further comprising:
at least two inputs of an integrated circuit responsive to an external power source, the at least two inputs including a first input and a second input; and
a diode bridge responsive to the at least two inputs to provide a rectified power supply to a first power supply terminal and a second power supply terminal;
wherein the external power source comprises power sourcing equipment.

5. The powered device of claim 4, wherein the voltage protection circuit is coupled between the first and second power supply terminals.

6. The powered device of claim 1, wherein the snubber circuit impedes current flow when the voltage across the snubber circuit is less than a threshold, and wherein the snubber circuit directs energy to the voltage protection circuit when the voltage across the snubber circuit exceeds the threshold.

7. The powered device of claim 1, wherein the energy is received after an inductive kick of the external transformer at the at least one of the two inputs.

8. The powered device of claim 1, wherein the energy is received after an electrostatic discharge (ESD) event.

9. The powered device of claim 1, further comprising:
logic to selectively activate the switch when at least two inputs including a first input and a second input of the integrated circuit are coupled to the external power source.

10. A method comprising:
detecting a power event at a snubber circuit of an integrated circuit, the snubber circuit responsive to first and second pins coupled to an external transformer, the external transformer coupled to a negative supply terminal of the integrated circuit;
directing energy resulting from the power event to a voltage protection circuit via the snubber circuit when a voltage level of the power event exceeds a threshold, the threshold being less than a safe power level of a switch within the integrated circuit;
wherein the voltage protection circuit is adapted to shunt a current between a first power supply terminal and a second power supply terminal and to clamp a voltage between the first and second power supply terminals to a level that is below a voltage rating associated with the switch.

11. The method of claim 10, wherein the power event comprises an electrostatic discharge (ESD) event.

12. The method of claim 10, wherein the power event comprises an inductive voltage kick.

13. The method of claim 10, wherein detecting the power event comprises:
detecting a voltage in excess of a breakdown voltage level of a breakdown diode circuit of the snubber circuit.

14. The method of claim 10, wherein the voltage protection circuit is part of the integrated circuit.

15. The method of claim 10, wherein the safe power level of the switch comprises a voltage rating determined by a manufacturer of the switch.

16. The method of claim 10, further comprising:
detecting a power supply from an external power source; and
selectively activating the switch responsive to detection of the power supply to deliver power to an external transformer.

17. An integrated circuit comprising:
a transistor including a first terminal, a second terminal coupled to a first power supply terminal, and a control terminal;
a pin coupled to the first terminal of the transistor and responsive to an external transformer; and
a snubber circuit responsive to the pin to direct an inductive voltage that exceeds a threshold to a voltage protection circuit to protect the transistor, the snubber circuit comprising:
a first diode circuit including an anode terminal coupled to a second power supply terminal of the pair of power supply terminals and including a cathode terminal; and
a second diode circuit including an anode terminal coupled to the interface and a cathode terminal coupled to the cathode terminal of the first diode circuit;
wherein the first diode circuit blocks current flow when a voltage level across the snubber circuit is less than the threshold.

18. The integrated circuit of claim 17, wherein the snubber circuit is responsive to the pin to direct energy resulting from an electrostatic discharge (ESD) event from the pin to the voltage protection circuit.

19. The integrated circuit of claim 17, further comprising a Power over Ethernet (PoE) protocol circuit to provide PoE protocol functions including PoE detection.

20. The integrated circuit of claim 17, further comprising:
a diode bridge responsive to a communication interface to receive a power supply input from power sourcing equipment and to provide a rectified power supply to a pair of power supply terminals, the pair of power supply terminals including the first power supply terminal.

21. The integrated circuit of claim 20, wherein the voltage protection circuit is coupled between the pair of power supply terminals.

22. The integrated circuit of claim 17, wherein the threshold is defined by a breakdown voltage of a diode circuit.

23. A powered device comprising:
first and second input pins responsive to an external power source;
first and second output pins responsive to an external transformer, the first output pin coupled to the first input pin;
an output switch responsive to a logic circuit;
a third output pin coupled to the second input pin via the output switch;

a voltage protection circuit to limit an input voltage to a level that is less than an over-voltage threshold; and a snubber circuit responsive to the second pin and adapted to direct an inductive voltage that exceeds an output threshold to a voltage protection circuit to protect the output switch;

wherein, when a voltage across the first and second input pins is below below the over-voltage threshold and an output voltage across the first and second output pins exceeds the output threshold, power applied to the second output pin is directed to the voltage protection circuit;

wherein, when a voltage on the first and second input pins is at a voltage level that between the over-voltage threshold and an input threshold, power applied to the second output pin is directed to the third output pin via the output switch.

24. The powered device of claim 23, wherein the first and second input pins, the first and second output pins, the third output pin, and the logic are fabricated on an integrated circuit.

25. The powered device of claim 23, wherein the snubber circuit is coupled to the first output pin and to the second output pin, the powered device further comprising:

a switch coupled to the second output pin and to the third output pin, the switch to selectively connect the external transformer to the second output pin.

26. The powered device of claim 25, wherein the snubber circuit and the voltage protection circuit limit the first voltage to a level that is less than a voltage rating of the switch.

* * * * *